United States Patent
Martoni

(10) Patent No.: US 11,553,696 B2
(45) Date of Patent: Jan. 17, 2023

(54) LAYING NEST PROVIDED WITH AN IMPROVED EJECTION SYSTEM

(71) Applicant: VALLI S.P.A., Galeata (IT)

(72) Inventor: Fausto Martoni, Galeata (IT)

(73) Assignee: VALLI S.R.L., Galeata (IT)

( * ) Notice: Subject to any disclaimer, the term of this patent is extended or adjusted under 35 U.S.C. 154(b) by 335 days.

(21) Appl. No.: 16/644,226

(22) PCT Filed: Aug. 3, 2018

(86) PCT No.: PCT/IB2018/055868
§ 371 (c)(1),
(2) Date: Mar. 4, 2020

(87) PCT Pub. No.: WO2019/048948
PCT Pub. Date: Mar. 14, 2019

(65) Prior Publication Data
US 2020/0196576 A1    Jun. 25, 2020

(30) Foreign Application Priority Data
Sep. 5, 2017   (IT) .......................... 102017000099022

(51) Int. Cl.
*A01K 31/00*   (2006.01)
*A01K 31/16*   (2006.01)
(Continued)

(52) U.S. Cl.
CPC .......... *A01K 31/165* (2013.01); *A01K 31/007* (2013.01); *A01K 1/015* (2013.01);
(Continued)

(58) Field of Classification Search
USPC ....... 119/337, 334, 335, 336, 329, 437, 440, 119/479, 480, 340, 339, 330, 331, 332,
(Continued)

(56) References Cited

U.S. PATENT DOCUMENTS

| 1,194,432 A * | 8/1916 | Sigler | A01K 31/16 119/332 |
| 1,224,318 A * | 5/1917 | Paulson | A01K 31/16 119/332 |

(Continued)

FOREIGN PATENT DOCUMENTS

| DE | 4203637 | * 8/1993 | ............. A01K 31/16 |
| DE | 20 2013 102 427 U1 | 6/2013 | |

(Continued)

OTHER PUBLICATIONS

International Search Report and Written Opinion of the International Searching Authority dated Oct. 18, 2018 for International Patent Application No. PCT/IB2018/055868.

*Primary Examiner* — Andrea M Valenti
(74) *Attorney, Agent, or Firm* — Howson & Howson LLP

(57) ABSTRACT

A laying nest is provided with an improved ejection system, in which the risk of expelling eggs together with the hens is suppressed. The floor of the laying nest can rotate in both directions. Thanks to this arrangement, at first it can be rotated in a first direction for inclining it towards the egg collection area and ensuring that all the laid eggs are removed; next, it can be rotated in a second, opposite direction for inclining it towards the hen coop and thus expelling the hens from the laying nest. In a preferred embodiment, the driving arrangement of the ejection system of the laying nest is entirely arranged below the floor of the laying nest, so as to not occupy room in the laying nest and to be protected from manures and dirt that may be present in the laying nest.

8 Claims, 4 Drawing Sheets

(51) Int. Cl.
   *A01K 1/015* (2006.01)
   *A01K 31/22* (2006.01)
   *A01K 45/00* (2006.01)
(52) U.S. Cl.
   CPC .............. *A01K 31/22* (2013.01); *A01K 45/00* (2013.01); *B65G 2201/0208* (2013.01)
(58) Field of Classification Search
   USPC .................................. 119/341, 434, 344, 342
   See application file for complete search history.

(56) References Cited

U.S. PATENT DOCUMENTS

| | | | | |
|---|---|---|---|---|
| 1,396,407 A | * | 11/1921 | Cowgill | .................. A01K 31/16 119/331 |
| 1,399,614 A | * | 12/1921 | Groves | .................. A01K 31/16 119/335 |
| 2,090,906 A | * | 8/1937 | Teel | ........................ A01K 31/16 119/335 |
| 3,292,583 A | * | 12/1966 | Peterson | ................. A01K 31/16 119/329 |
| 3,941,091 A | * | 3/1976 | Fleshman | .......... A01K 31/17 119/474 |
| 5,058,530 A | * | 10/1991 | Van De Ven | .......... A01K 31/16 119/337 |
| 5,222,459 A | * | 6/1993 | Johnson | ................. A01K 31/16 119/330 |
| 6,394,031 B1 | | 5/2002 | Moller | |
| 9,510,567 B2 | | 12/2016 | Donker et al. | |
| 11,039,604 B2 | * | 6/2021 | van Dalen | ............. A01K 31/00 |
| 11,129,368 B2 | * | 9/2021 | Schürmann | ............ G01G 21/22 |

FOREIGN PATENT DOCUMENTS

| | | | |
|---|---|---|---|
| DE | 20213102427 U1 * | 6/2013 | ............. A01K 31/06 |
| EP | 1736047 A1 | 12/2006 | |
| EP | 2989891 A1 | 3/2016 | |
| FR | 2801471 A1 | 6/2001 | |

* cited by examiner

LAYING NEST PROVIDED WITH AN IMPROVED EJECTION SYSTEM

TECHNICAL FIELD OF THE INVENTION

The present invention relates to a laying nest, which is used in poultry farms, for example in laying hen breeding farms.

More particularly, the present invention relates to a laying nest provided with an improved ejection system.

PRIOR ART

Poultry farms for laying hens are known in which hens are housed in cages or coops provided with egg laying nests.

Said laying nests are usually slightly inclined towards a collection area, which is arranged on the opposite side of the laying nests with respect to the coops and is inaccessible to the hens, and through which a conveyor belt passes. In this way, the laid eggs can be transferred from the laying nests to said conveyor belt to be conveyed to the different steps needed for their packaging.

If on one hand it is desirable that during the day the hens stay in the area of the laying nest and lay the eggs in said nest, on the other hand it is also preferable to prevent them from remaining in the area of the laying nest during the night.

For this reason, ejection systems have been developed for forcing the hens out of the laying nests.

Ejection systems are known in which a pivoting plate hinged above the laying nest is used for pushing the hens out of the laying nest. An ejection system of this type is described for example in document U.S. Pat. No. 9,510,567.

However, said ejection systems have several drawbacks, among which the most penalizing one is that they are complex and bulky. Furthermore, it is not possible to exclude the risk that the plates hurt the hens when they push them out of the nests.

Ejection systems are also known in which the floor of the laying nests is hinged at the side near the coop (i.e. at the side opposite the collection area) and it can be rotated until the inclination of the floor becomes such that the hens are induced to leave the laying nest.

More particularly, said floor can be rotated until it assumes a substantially vertical position, forcing the hens away from the laying nest. An ejection system of this type is described for example in document EP 2 989 891.

Also this second type of ejection system, however, is not free from drawbacks.

Firstly, it should be considered that under normal conditions, the floor of the laying nest is only slightly inclined towards the collection area. More particularly, according to the regulations on the welfare of farm animals in European Union countries, the inclination of the floor can be at most 10°-15°.

As a consequence it is possible that some of the laid eggs do not roll towards the collection area. In this case, they will be expelled from the nest together with the hens, thus breaking inside the coop.

Secondly, in the ejection systems of this type the rotation of the floor is usually obtained by using a pinion-and-rack driving arrangement. Such driving arrangements are subject to the risk of jamming and malfunctioning; what is more, this risk is exacerbated by the fact that manures and dirt may be present in the environment in which they operate.

An object of the present invention is therefore to provide a laying nest provided with an improved ejection system.

More particularly, an object of the present invention is to provide a laying nest provided with an ejection system in which the risk of expelling eggs together with the hens is suppressed.

Another object of the present invention is to provide a laying nest with an ejection system provided with a driving arrangement which is simple and reliable and has limited space requirement.

These and other objects are achieved by the laying nest as claimed in the appended claims.

SUMMARY OF THE INVENTION

Due to the fact that the floor of the laying nest according to the present invention can rotate in both directions, starting from a basic position in which it is substantially parallel to the ground or slightly inclined towards the collection area, at first it can be rotated in a first direction for inclining it towards the collection area and ensuring that all the laid eggs are removed, and then it can be rotated in a second direction for inclining it towards the coop and thus expelling the hens from the nest.

In a preferred embodiment of the invention, the driving arrangement of the ejection system of the laying nest according to the present invention is entirely arranged below the floor of the laying nest.

Advantageously, thanks to this configuration, said driving arrangement does not occupy the volume of the laying nest occupied by the hens.

Furthermore, thanks to this configuration, the driving arrangement is protected from manures and dirt that may be present in the laying nest.

In a particularly preferred embodiment of the invention, the driving arrangement of the ejection system of the laying nest according to the present invention comprises a rocker mounted on a rotation shaft which can be alternately rotated in a clockwise or counterclockwise direction, the arms of said rocker being configured to push respective opposite sides of the floor of the laying nest for causing rotation of said floor in a first direction or in a second, opposite direction.

In a preferred embodiment of the invention, the floor of the laying nest is removably mounted in the laying nest itself, so that it can be easily removed, for example for inspection and cleaning purposes.

In a particularly preferred embodiment of the invention, the floor of the laying nest can be removed without intervening in any way on the driving arrangement of the ejection system of the laying nest.

BRIEF DESCRIPTION OF THE DRAWINGS

Further features and advantages will become more evident from the following detailed description of a preferred embodiment of the invention, given by way of non-limiting example, with reference to the attached drawings in which.

DETAILED DESCRIPTION OF A PREFERRED EMBODIMENT OF THE INVENTION

Figure 1A:
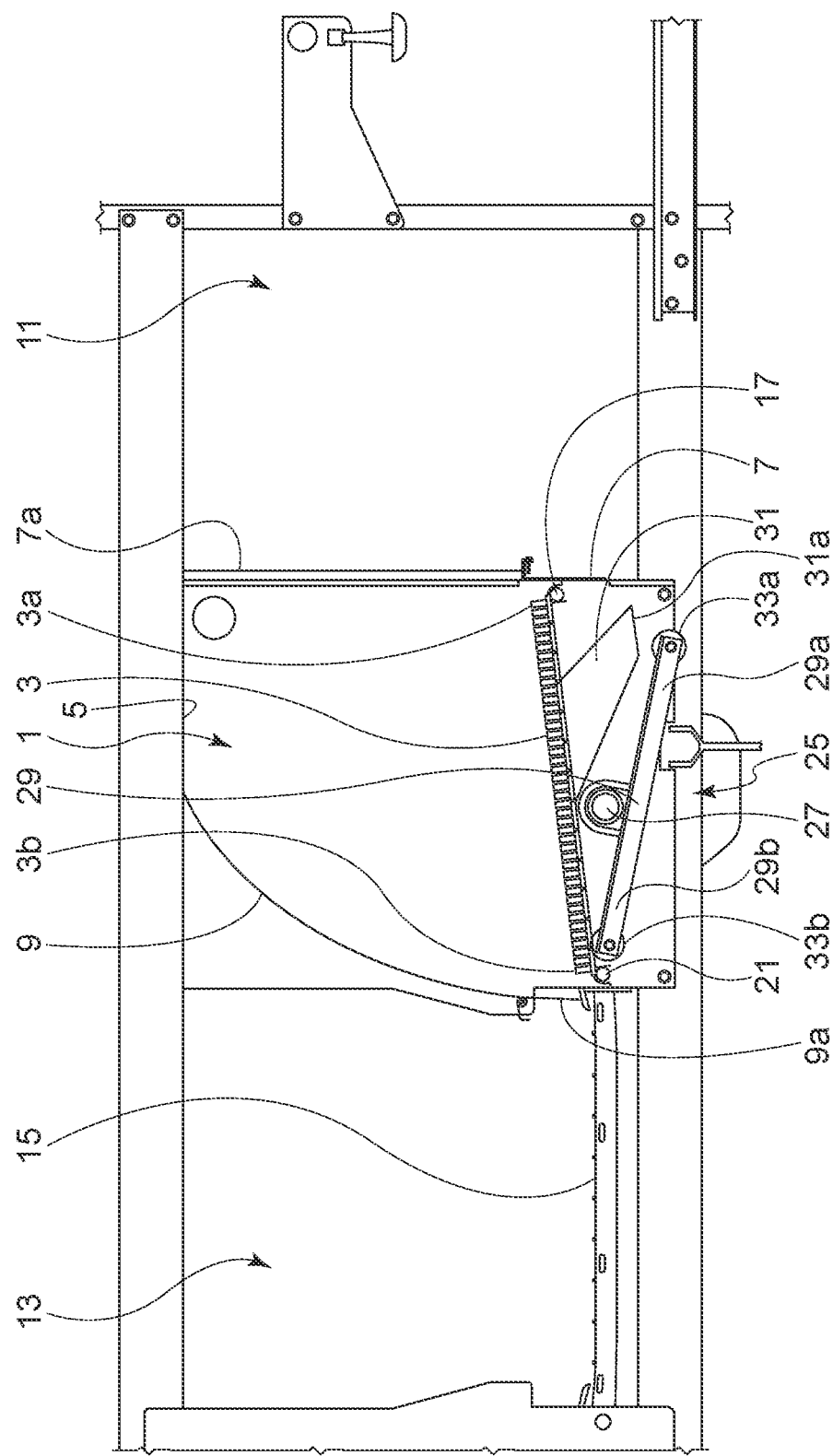
FIGS. 1a-1d show, in schematic cross-sectional views, the laying nest according to the invention, in four different configurations.

FIGS. 1a-1d schematically show a laying nest 1 according to the invention

Said nest 1 comprises a floor 3, a roof 5 and side walls, a first side wall 7 being adjacent to the area of a coop 11 for laying hens and comprising an entry opening 7a for allowing laying hens to enter the laying nest and exit therefrom, and a second lateral wall 9 being adjacent to the area of a collection zone 13 for the laid eggs and comprising, at its lower portion, a discharge opening 9a for allowing the transfer of the laid eggs from the laying nest to the collection area 13.

In the shown embodiment, the second side wall 9 is curved, for reasons that will become evident below; however, other shapes for the laying nest 1 are possible as well.

A conveyor belt 15 is provided at the bottom of the collection area 13, which conveyor belt transports the eggs coming from the laying nest 1 to the successive steps of the packaging process.

According to the invention, the floor 3 of the nest 1 is arranged rotatable about a first rotation axis, which is parallel to said first side wall 7 and adjacent thereto, and further rotatable about a second rotation axis, which is parallel to said second side wall 9 and adjacent thereto.

For this purpose, a first rotation pin 17 is arranged parallel to said first side wall 7 and adjacent thereto, and the floor 3 of the nest 1, at a first one 3a of its sides which is parallel and adjacent to said first side wall 7, is provided with first engagement means 19 which are configured to releasably engage said first rotation pin and, when they are engaged with it, allow rotation of the floor 3 about said first rotation pin.

More particularly, said first engagement means 19 can be made as a portion of cylindrical surface having a longitudinal axis parallel to the axis of said first rotation pin 17 and a diameter substantially equal to the diameter of said first rotation pin 17.

Moreover, a second rotation pin 21 is arranged parallel to said second side wall 9 and adjacent thereto, and the floor 3 of the nest 1, at a second one 3b of its sides which is parallel and adjacent to said second side wall 9, is provided with second engagement means 23 which are configured to releasably engage said second rotation pin and, when they are engaged with it, allow rotation of the floor 3 around said second rotation pin.

More particularly, said second engagement means 23 can be made as a portion of cylindrical surface having a longitudinal axis parallel to the axis of said second rotation pin 21 and a diameter substantially equal to the diameter of said second rotation pin 21.

Thanks to this configuration, the floor 3 of the deposition nest 1 can be rotated in both directions, i.e. so as to incline it towards the collection area 13, as well as to incline it towards the coop 11.

Moreover, thanks to the fact that the first and second engagement means 19, 23 are configured to releasably engage the rotation pins 17, 21, the floor 3 can be easily removed from the laying nest, for example for inspection and cleaning purposes.

More particularly, in the embodiment shown in the FIGURES, the floor 3 can be removed without intervening in any way on the driving arrangement of the ejection system, as will be clear from the following description.

In FIG. 1a, the laying nest 1 is shown in a first configuration or basic configuration, which corresponds to the configuration in which the laying hens have access to the nest and can lay eggs in said nest.

In this first configuration, the floor 3 of the nest 1 rests on both rotation pins 17, 21 and the first and second engagement means 19, 23 are in engagement with the respective rotation pin.

In this first configuration, the floor 3 of the nest 1 may be substantially horizontal (i.e. parallel to the ground) or—as shown in FIG. 1a—slightly inclined towards the collection area 13, with an inclination angle not greater than 15°. Under these conditions the inclination of the floor 3 of the laying nest 1 is not annoying for the hens, which can stand in the nest and lay the eggs therein.

Figure 1B:
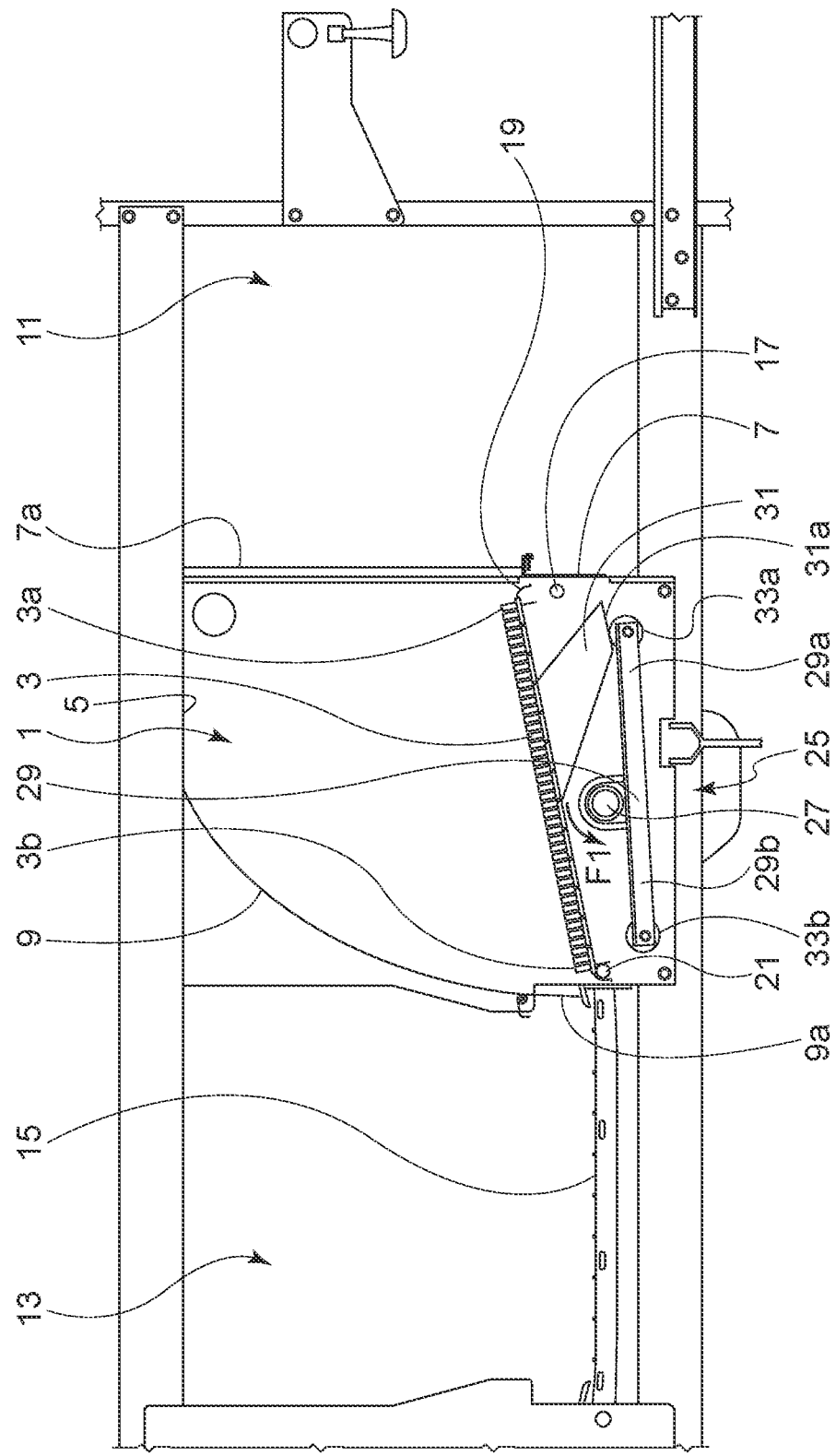

Once the hens have laid their eggs and have to be expelled from the laying nest 1, at first the floor 3 of said nest can be rotated about the second rotation pin 21—i.e. counterclockwise in the FIGURES—and brought to the position of FIG. 1b.

In the configuration of FIG. 1b, the second engagement means 23 are still engaged with the second rotation pin 21, while the first engagement means 19 have released the first rotation pin 17 and the side 3a of the floor 3 adjacent to the coop 11 is raised with respect to said first rotation pin.

In this configuration, the floor 3 is more inclined towards the collection zone 13, so that any laid eggs which are still present on the floor 3 of the laying nest roll towards the discharge opening 9a of the side wall 9 and, through said opening, into the collection area 13.

An inclination of 20°-30° is sufficient, on one side, for ensuring that all the eggs are removed and, on the other side, is sufficiently low to not cause excessive discomfort to the hens present in the nest.

Figure 1C:
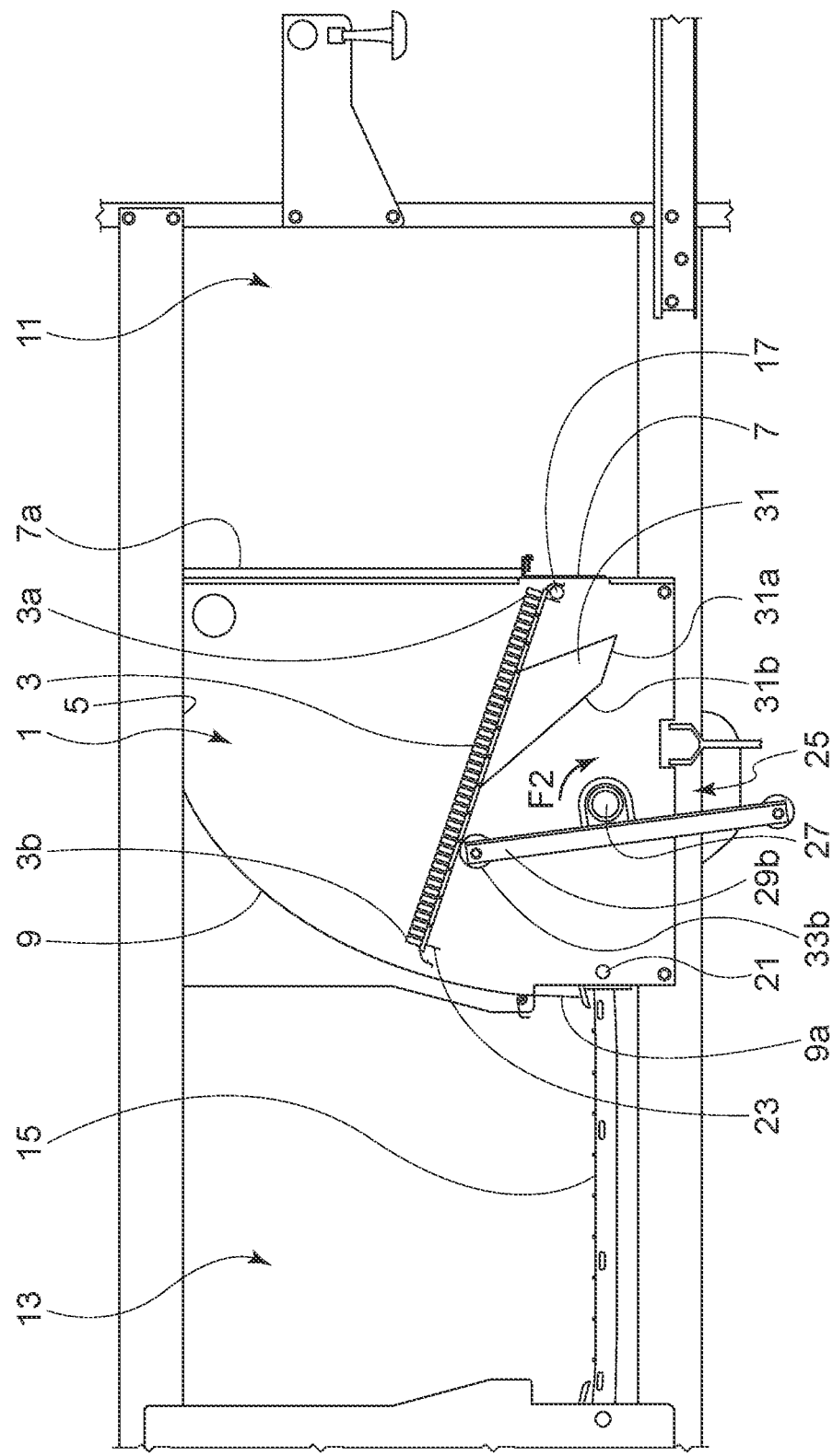

Next, the floor 3 of the laying nest 1 is brought back to the basic configuration (by rotating it clockwise about the second pivot pin 21) and then it is rotated about the first pivot pin 17—i.e. clockwise in the FIGURES—so as to bring it to the configuration of FIG. 1c.

In the configuration of FIG. 1c, the first engagement means 19 are in engagement with the first rotation pin 17, while the second engagement means 23 have released the second rotation pin 21 and the side 3b of the floor 3 adjacent to the collection area 13 is raised with respect to said second rotation pin.

In this configuration, the floor 3 is inclined towards the coop 11 rather than towards the collection area 13, so as to invite the hens to leave the laying nest 1 and go back into the coop 11.

As can be clearly seen in FIG. 1c, thanks to the fact that the second side wall 9 of the laying nest 1 is curved, the side 3b of the floor 3 always remains adjacent to said second side wall 9 as the floor 3 rotates about the first rotation pin 17.

Figure 1D:
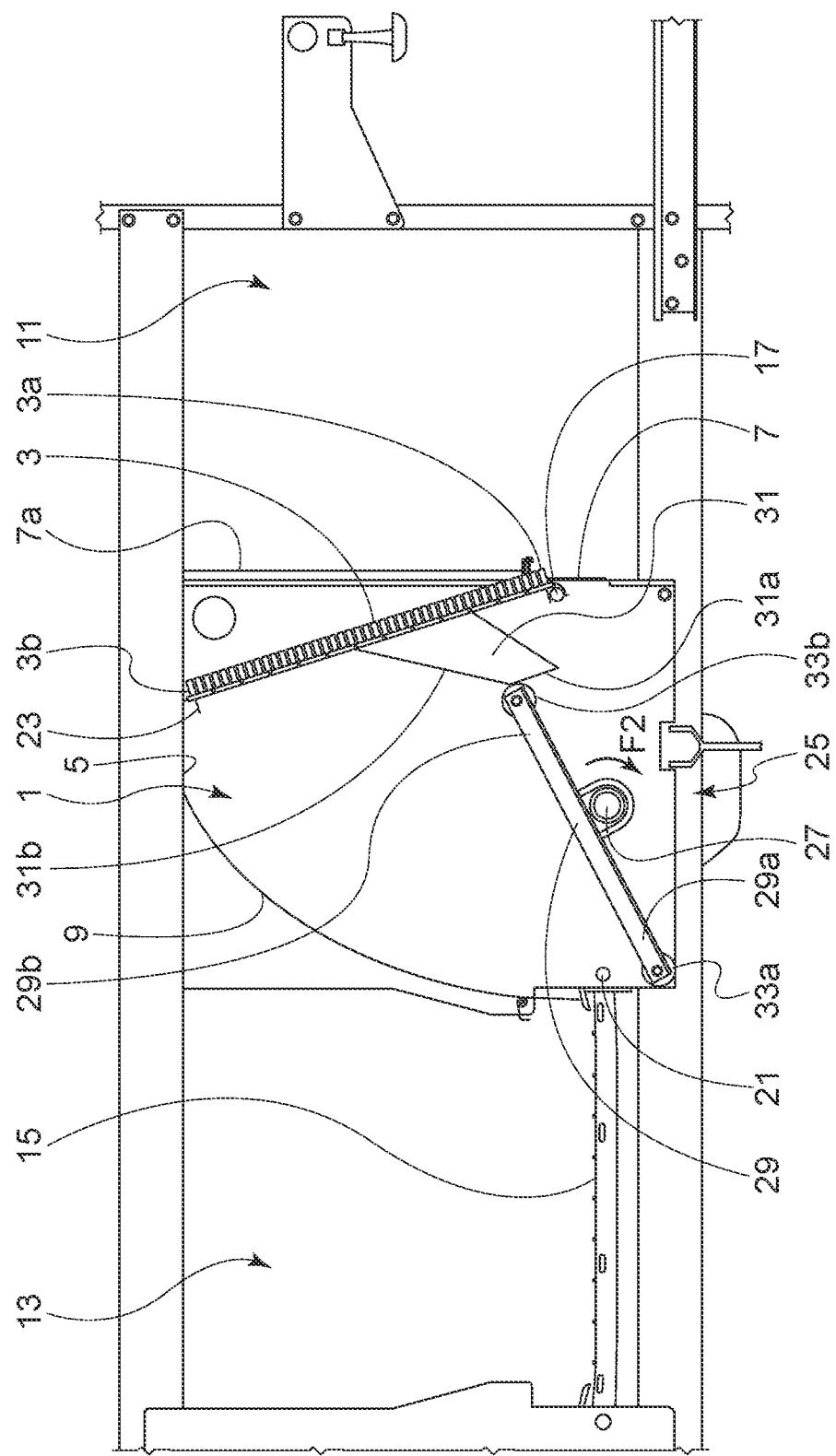

In order to force the hens out of the nest, the floor 3 is further rotated about the first rotation pin 17 until bringing it to the configuration of FIG. 1d.

In this configuration, the floor 3 of the laying nest 1 is strongly inclined towards the coop 11 and substantially closes the entry opening 7a of the first side wall 7, which forces the hens to leave the nest and prevents them from returning into said nest until the floor 3 is maintained in said position.

When it is desired to allow the hens to enter the laying nest again, the floor 3 of said nest can be brought back to the basic configuration of FIG. 1a, by rotating it counterclockwise about the first rotation pin 17.

Any driving arrangement within the reach of the person skilled in the art for driving the rotation of the floor 3 of the laying nest 1 about the first and second rotation pins 17, 21 so as to obtain the above-described sequence of configurations can be used.

In the preferred embodiment of the invention shown in FIGS. 1a-1d, the laying nest 1 is provided with a particularly advantageous driving arrangement 25: said driving arrangement 25 is entirely arranged below the floor 3 of the nest and it does not comprise any pinions, racks or other elements that could be subject to getting stuck or jammed, which makes it simple and reliable.

Moreover, the driving arrangement 25 allows, with a limited number of components, to carry out both the rotation of the floor 3 of the laying nest 1 about the first rotation pin 17 and the rotation about the second rotation pin 21, so as to obtain the above-described sequence of configurations.

The driving arrangement 25 comprises a rotation shaft 27, which is arranged below the floor 3 of the laying nest 1, substantially at a central position, and which can be rotated in both directions, and a rocker 29, which is integral with the rotation shaft 27 and comprises two diametrically opposed arms 29a, 29b, which are arranged for contacting the opposite sides 3a, 3b of the floor 3, respectively, and exerting a pressure onto said sides for causing rotation of said floor about the second rotation pin 21 and the first rotation pin 17, respectively.

The arms 29a, 29b of the rocker 29 can directly act onto the lower face of the floor 3 of the laying nest 1.

Alternatively, one or more extensions 31 can be provided on the lower face of said floor 3 and the arms 29a, 29b of the rocker 29 can act onto the lower face of the floor 3 through said extensions 31. In the shown embodiment, only one extension 31a is provided on the lower face of the floor 3. By appropriately selecting the profile of said extension(s) it is possible to obtain the desired motion transmission from said arms 29a, 29b to said floor 3. More particularly, it is possible to make the arms 29a, 29b exert their pressure onto the floor 3 at a point sufficiently far from the rotation shaft 27 to provide a sufficiently long moment arm for the generated rotation torque.

The ends of the arms 29a, 29b of the rocker 29 are preferably provided with respective idle wheels 33a, 33b.

In the basic configuration of 1a, the arms 29a, 29b of the rocker 29 do not exert any pressure onto the floor 3 of the laying nest 1.

By comparing FIGS. 1a and 1b, it can be seen that the rotation shaft 27 has been rotated counterclockwise (arrow F1). Accordingly, the first arm 29a of the rocker 29, with its idle wheel 33a, has come into contact with a first surface 31a of the extension 31 and, through said surface, has exerted a pressure onto the floor 3 of the nest, at the first side 3a of said floor parallel and adjacent to the coop 11.

This pressure has caused disengagement of the first engagement means 19 from the first rotation pin 17 and subsequent raising of the side 3a of the floor 3, therefore an increase in the inclination of the floor 3 towards the collection area 13, as shown in FIG. 1b.

By comparing FIGS. 1b and 1c, it can be seen that the rotation shaft 27 has been rotated in the opposite direction, i.e. clockwise (arrow F2). Initially, the floor 3 has been brought back to the basic position. The further clockwise rotation of the rotation shaft 27 has brought the second arm 29b of the rocker 29, with its idle wheel 33b, to come into contact with the lower face of the floor 3 of the nest, at the second side 3b of said floor parallel and adjacent to the collection area 13, and to exert pressure onto said face.

This pressure has caused disengagement of the second engagement means 23 from the second rotation pin 21 and subsequent raising of the side 3b of the floor 3 as the idle wheel 33b has rolled onto the lower face of the floor 3, with a consequent inversion of the inclination of said floor 3 towards the coop 11, as shown in FIG. 1c.

It is evident that, if the second arm 29b of the rocker 29 only acted directly onto the lower face of the floor 3, the inclination which can be reached by said floor would be limited by the length of said arm.

However, thanks to the provision of the extension 31, the rotation shaft 27 can be further rotated clockwise (arrow F2) without the arm 29b losing contact with the floor 3, while the wheel 33b provided at the end of said arm passes from the lower face of the floor 3 to a second surface 31b of the extension 31 of said floor. In this way, the arm 29b can continue to (indirectly) exert a pressure onto the floor 3 and cause a further rotation thereof, until bringing it to the position of FIG. 1d.

It is evident that, starting from the configuration of FIG. 1d, a counterclockwise rotation of the rotation shaft 27 allows to bring the floor 3 back to the basic configuration of FIG. 1a.

It is also evident that, as mentioned above, the floor 3 can be removed from the laying nest 1 without intervening in any way on the driving arrangement 25 of the ejection system of said lying nest.

From the above description, it will be evident to the person skilled in the art that the invention allows to achieve the objects set forth above, as it allows to provide a laying nest with an improved ejection system with respect to the known systems.

It will also be evident to the person skilled in the art that the above described and illustrated embodiment has been given by way of mere example and that several modifications and variants can be made, without departing from the scope of protection as defined by the appended claims.

The invention claimed is:

1. A laying nest, comprising:
    a floor, a roof, and side walls including a first side wall, comprising an entry opening, and a second side wall, opposite to the first side wall and comprising a discharge opening,
    wherein the floor is a platform,
    wherein the platform is rotatable about a first rotation axis which is parallel to the first side wall and adjacent to the first side wall, and the platform is rotatable about a second rotation axis which is parallel to the second side wall and adjacent to the second side wall,
    wherein the laying nest has a driving arrangement for rotating the platform about the first rotation axis and the second rotation axis, and
    wherein the driving arrangement comprises a rotation shaft, arranged below the floor, substantially at a middle position, which rotation shaft is rotatable in both opposite directions, and a rocker, which is integral to the rotation shaft and comprises two diametrically opposed arms which are arranged for coming into contact with and exerting a pressure onto a first side of the platform which is adjacent to the first side wall and onto a second side of the platform which is adjacent to the second side wall, respectively.

2. The laying nest according to claim 1, further comprising:
    a first rotation pin arranged parallel to the first side wall and adjacent to the first side wall and the floor, at the first side of the platform that is adjacent to the first side wall, and
    a first engaging element configured to releasably engage the first rotation pin,
    wherein, when the first engaging element is engaged with the first rotation pin, the floor is able to be rotated about the first rotation pin, and
    wherein the first engaging element has a portion of cylindrical surface having a longitudinal axis parallel to the axis of the first rotation pin and a diameter substantially equal to the diameter of the first rotation pin.

3. The laying nest according to claim 2, further comprising:
   a second rotation pin is arranged parallel to the second side wall and adjacent to the second side wall and the floor, at the second side of the platform that is adjacent to the second side wall, and
   a second engaging element configured to releasably engage the second rotation pin,
   wherein, when the second engaging element is engaged with the second rotation pin, the floor is able to be rotated about the second rotation pin, and
   wherein the second engaging element has a portion of cylindrical surface having a longitudinal axis parallel to the axis of the second rotation pin and a diameter substantially equal to the diameter of the second rotation pin.

4. The laying nest according to claim 1, wherein one or more extensions are provided on a lower face of the floor and the arms of the rocker act onto the floor either directly or indirectly through the one or more extensions.

5. The laying nest according to claim 4, wherein the ends of the arms of the rocker are provided with respective idle wheels.

6. The laying nest according to claim 1, wherein the floor is mounted to the laying nest so as to be completely removable from the laying nest.

7. The laying nest according to claim 1, wherein ends of the arms of the rocker are provided with respective idle wheels.

8. The laying nest according to claim 1, further comprising:
   a rotation pin arranged parallel to the second side wall and adjacent to the second side wall and the floor, at the second side of the platform that is adjacent to the second side wall, and
   a second engaging element configured to releasably engage the rotation pin,
   wherein, when the second engaging element is engaged with the rotation pin, the floor is able to be rotated about the rotation pin, and
   wherein the second engaging element has a portion of cylindrical surface having a longitudinal axis parallel to the axis of the rotation pin and a diameter substantially equal to the diameter of the rotation pin.

* * * * *